(12) United States Patent
Wang et al.

(10) Patent No.: US 9,023,748 B2
(45) Date of Patent: May 5, 2015

(54) DIELECTRIC CERAMIC MATERIAL AND MULTILAYER CERAMIC CAPACITOR USING THE SAME

(75) Inventors: Sea-Fue Wang, Taipei (TW); Yuan-Cheng Lai, Taipei (TW); Jian-Hua Li, Taipei (TW); Ming-Hua Chen, Taipei (TW)

(73) Assignee: Holy Stone Enterprise Co., Ltd., Taipei (TW)

( * ) Notice: Subject to any disclaimer, the term of this patent is extended or adjusted under 35 U.S.C. 154(b) by 0 days.

(21) Appl. No.: 13/569,616

(22) Filed: Aug. 8, 2012

(65) Prior Publication Data
US 2013/0250482 A1  Sep. 26, 2013

(30) Foreign Application Priority Data
Mar. 22, 2012 (TW) ............................. 101109970 A

(51) Int. Cl.
| | |
|---|---|
| H01G 4/12 | (2006.01) |
| C04B 35/468 | (2006.01) |
| C04B 35/495 | (2006.01) |
| C04B 35/50 | (2006.01) |
| H01G 4/30 | (2006.01) |
| H01G 4/248 | (2006.01) |

(52) U.S. Cl.
CPC ............ *H01G 4/1227* (2013.01); *C04B 35/468* (2013.01); *C04B 35/495* (2013.01); *C04B 35/50* (2013.01); *H01G 4/30* (2013.01); *C04B 2235/3201* (2013.01); *C04B 2235/3203* (2013.01); *C04B 2235/3215* (2013.01); *C04B 2235/3229* (2013.01); *C04B 2235/3236* (2013.01); *C04B 2235/3251* (2013.01); *C04B 2235/3255* (2013.01); *C04B 2235/96* (2013.01); *H01G 4/248* (2013.01)

(58) Field of Classification Search
CPC ...... H01G 4/10; H01G 4/1227; C04B 35/468; C04B 35/4682
USPC ................. 501/137, 138, 139; 361/321.4
See application file for complete search history.

(56) References Cited

U.S. PATENT DOCUMENTS

| | | | |
|---|---|---|---|
| 6,426,018 B1 * | 7/2002 | Takahashi et al. | 252/62.9 R |
| 6,783,588 B2 * | 8/2004 | Aoto et al. | 117/4 |
| 6,793,843 B2 * | 9/2004 | Furukawa et al. | 252/62.9 R |
| 7,541,306 B2 | 6/2009 | Koebrugge et al. | |
| 7,751,178 B2 | 7/2010 | Suzuki | |
| 7,821,770 B2 | 10/2010 | Nishikawa et al. | |
| 8,194,392 B2 * | 6/2012 | Malhan et al. | 361/321.4 |
| 2009/0036293 A1 * | 2/2009 | Shimada et al. | 501/137 |
| 2009/0105064 A1 * | 4/2009 | Shimada et al. | 501/138 |

FOREIGN PATENT DOCUMENTS

JP   2003081675   *   3/2003

* cited by examiner

*Primary Examiner* — Karl Group
(74) *Attorney, Agent, or Firm* — Muncy, Geissler, Olds & Lowe, P.C.

(57) ABSTRACT

A dielectric ceramic material comprises a primary component of barium titanate ($BaTiO_3$) and at least one additive component. The additive component has a mole percentage from 1% to 50% and is selected from the group consisting of lithium tantalite ($LiTaO_3$), barium cerate ($BaCeO_3$), sodium metaniobate ($NaNbO_3$) and the combinations thereof.

2 Claims, 5 Drawing Sheets

DIELECTRIC CERAMIC MATERIAL AND MULTILAYER CERAMIC CAPACITOR USING THE SAME

FIELD OF THE INVENTION

The present invention relates to a dielectric ceramic material for fabricating a multilayer ceramic capacitor (MLCC), and more particularly to a dielectric ceramic material includes a primary component of barium titanate ($BaTiO_3$) and a second component of other dielectric material with a higher Curie temperature for providing the device of MLCC a wider application and a more stability.

BACKGROUND OF THE INVENTION

The multilayer ceramic capacitors are widely used in current electronic products, such as personal computer (PC), mobile phones, vehicle electronic devices, and etc. The structure of a multilayer ceramic capacitor includes a dielectric ceramic body and inner and outer electrodes. The dielectric ceramic body includes barium titanate ($BaTiO_3$) as a primary component and some other various additives for forming the NPO, COG, Y5V, X7R, X8R, Z5U, etc. type of multilayer ceramic capacitors. The applications of these multilayer ceramic capacitors are also different basing on their electrical property, while the property is mainly decided by the dielectric ceramic body.

The multilayer ceramic capacitors satisfying the X8R characteristics of the EIA standard are widely used in the microelectronic devices operating at a large temperature range due to the good stability of the dielectric temperature from −55 to 150° C. and $\Delta C/C \leq 15\%$. However, for some vehicle electronic devices, such as the electronic engine controlling units (ECU), the anti-lock braking systems (ABS), the programmed fuel injection system (PGM FI), and etc., it is required to operate in more critical conditions. Therefore, it is needed for the multilayer ceramic capacitors to have smooth and large operating temperature range in the case that they are applied in such critical conditions. With the advance of technology and basing on safety consideration, development of the dielectric material for satisfying the X9R characteristics (−55 to 200° C. and $\Delta C/C \leq 15\%$) regulated by the Association of Electrical Industry, or satisfying the operation with more large temperature range, becomes the inevitable demand.

In the current development of the multilayer ceramic capacitors satisfying the X8R characteristics, barium titanate ($BaTiO_3$) is usually applied to be a primal component due to its higher dielectric constant. However, the crystal structure of barium titanate will transfer to the paraelectric cubic phase from the ferroelectric tetragonal phase and a dielectric peak will appear at the Curie temperature (Tc), which will affect the dielectric temperature stability. Because the Curie temperature of barium titanate is about 130° C., it is necessary for the dielectric ceramic material mainly formed of barium titanate to add various Curie shifter, grain growth inhibitor and sintering aids, etc., for promoting the temperature stability of the dielectric material.

The published U.S. Pat. No. 7,821,770 discloses a multilayer ceramic capacitor satisfying the X8R characteristics and having a high stability in the high temperature environments. The components include 100 mol of barium titanate ($BaTiO_3$), 0.4 to 3.0 mol of magnesium oxide (MgO), 6.0 to 16.5 mol of rare earth oxide ($ReO_{3/2}$), 3 to 5 mol of silicon oxide ($SiO_2$) and 0.05 to 0.4 mol of metal oxide ($MO_x$), wherein the rare earth oxide can also be selected form the oxide of Sm, Eu, Gd, Tb, Dy, Ho, Er, Tm, Yb or Y; and the metal oxide can be selected from the oxide of V, Cr or Mn.

Another published U.S. Pat. No. 7,541,306 also discloses a multilayer ceramic capacitor satisfying the X8R characteristics. The dielectric ceramic material includes the barium titanate base material doped with other metal oxides such as BaO, $Y_2O_3$, $ZrO_2$, $SiO_2$, MgO, MnO, $MoO_3$, CaO, $Lu_2O_3$, $Yb_2O_3$, or $WO_3$.

The published U.S. Pat. No. 7,751,178 discloses a dielectric ceramic material for promoting the stability of the multilayer ceramic capacitors to satisfy the X8R characteristics (−55 to 150° C. and $\Delta C/C \leq 15\%$). The dielectric material includes a perovskite type compound as a primary component. The chemical regulation of the compound is $(Ba_{1-x-y}Ca_xSn_y)_m(Ti_{1-z}Zr_z)O_3$, wherein $0.1 \leq x \leq 0.2$, $0.02 \leq y \leq 0.2$, $0 \leq z \leq 0.05$, $0.99 \leq m \leq 1.015$. The dielectric material also includes the accessory component of rare earth elements. Each 100 mole of the perovskite type compound is added with 0.5 to 20 mole of the accessory component, and the accessory component is selected from the group consisting of La, Ce, Pr, Nd, Sm, Eu, Gd, Tb, Dy, Ho, Er, Tm, Yb, Lu and Y.

However, with the advance of the technical development, the demand to the material is also increased. Therefore, if the multilayer ceramic capacitors can be operated in a wide temperature range, the industry usage thereof will be further promoted.

SUMMARY OF THE INVENTION

The present invention provides a dielectric ceramic material which can be applied for a multilayer ceramic capacitor, meet the X9R characteristics of EIA, and can be manufactured by a Base-Metal-Electrode (BME) process or a Noble-Metal Electrode (NME) process. The dielectric ceramic material includes a primary component of barium titanate ($BaTiO_3$) and an additive component with a higher Curie temperature, wherein the additive component has a molar percent about 1% to 50% and a Curie temperature higher than 200° C., and is selected from the group consisting of lithium tantalite (LiTaO3), barium cerate ($BaCeO_3$), sodium metaniobate ($NaNbO_3$) and the combinations thereof.

The present invention also provides a multilayer ceramic capacitor comprising a ceramic capacitor body which includes a plurality of dielectric ceramic layers and a plurality of inner cathode layers and inner anode layers formed along surfaces of the dielectric ceramic layers, wherein the dielectric ceramic layers are formed by sintering the aforementioned dielectric ceramic material, and the inner cathode layers and the inner anode layers are staggered arranged. The multilayer ceramic capacitor further comprises an outer cathode and an outer anode, wherein the outer cathode and the outer anode are formed on outside of the ceramic capacitor body and respectively connected electrically to the inner cathode layers and inner anode layers. The capacitor temperature coefficient of the manufactured multilayer ceramic capacitor satisfies the X9R characteristics of the Electronics Industry Association (EIA) standard, namely an operating temperature range of the multiplayer ceramic capacitor is between −55 to 200° C., with zero bias capacitance shift limited to 15%.

The dielectric ceramic material proposed in the present invention all are sintered in a reduction atmosphere, which can be integrated with the Base-Metal-Electrode (BME) process currently used for manufacturing the multilayer ceramic capacitors, to facilitate the development and utilization on market. The dielectric property of the multilayer ceramic capacitors formed by the above dielectric ceramic material is stable to temperature change and satisfies the X8R and X9R characteristics of the EIA standard, thereby suitable to be applied in the electronic devices working in a large temperature range.

DESCRIPTION OF THE PREFERRED EMBODIMENT

Figure 1:
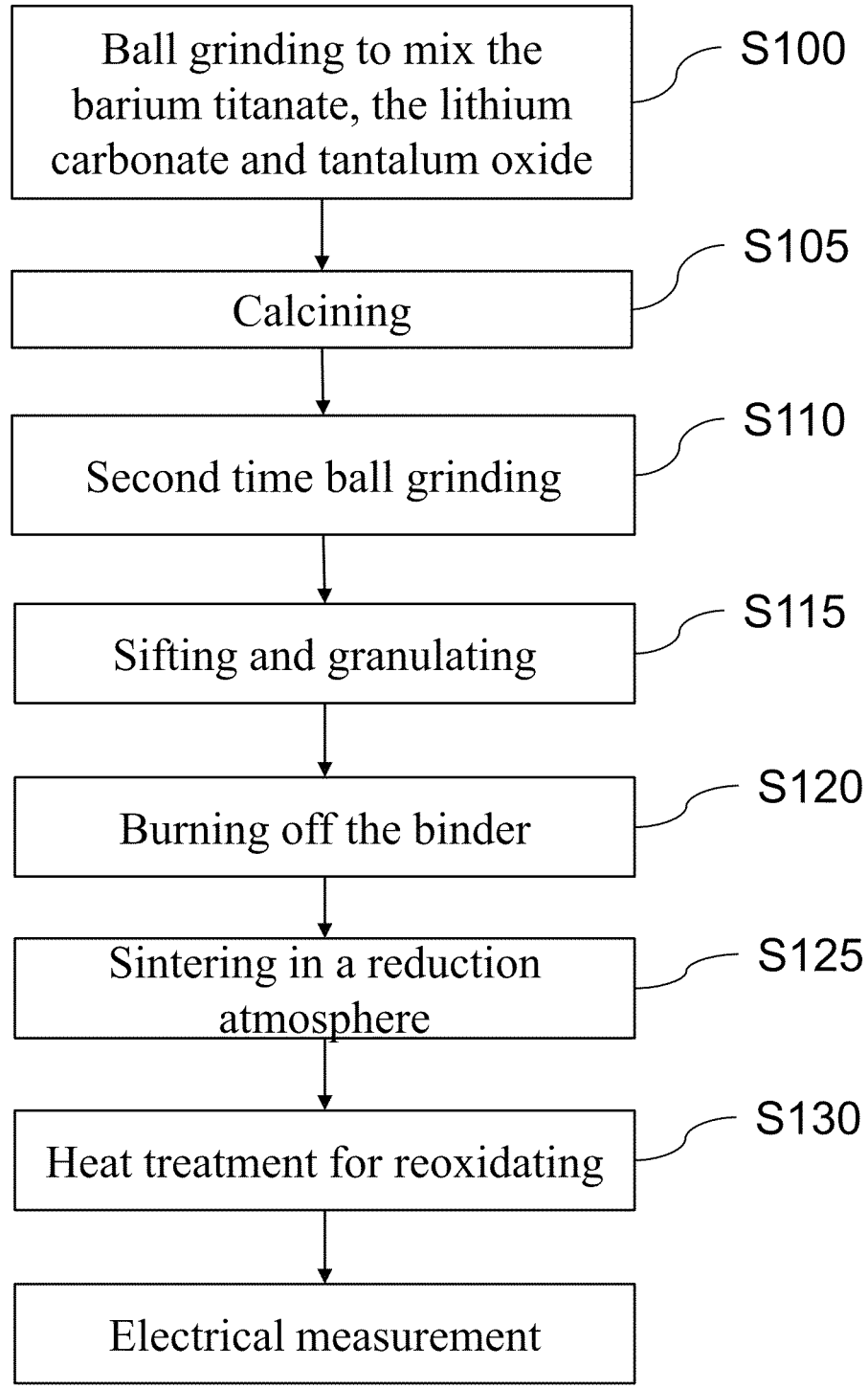
FIG. 1 is a flow chart showing a process for manufacturing the dielectric ceramic material according to the present invention.

In order to make the purpose above-described, features and advantages of the present invention can be more clearly understood, the following preferred embodiment and drawings are provided for introducing the dielectric ceramic material and the combination thereof.

The dielectric ceramic material proposed in the present invention includes a primary component of barium titanate ($BaTiO_3$) and an additive component with a higher Curie temperature (Tc). In one embodiment, the Curie temperature of the additive component is higher than 200° C., and is preferred higher than 300° C., thereby to shift the Curie temperature of the primary component of barium titanate ($BaTiO_3$) to be higher. Besides, it is better to select a ceramic material with high dielectric constant for serving as the additive component, thereby to prevent from lowering the dielectric constant of the whole dielectric ceramic material. The mole percentage of the additive component is about 1% to 50%, and preferred is 5% to 50%, for forming a composite phase with barium titanate ($BaTiO_3$).

In one embodiment, the additive component is selected from the group consisting of lithium tantalite (LiTaO3), barium cerate ($BaCeO_3$), sodium metaniobate ($NaNbO_3$) and the combinations thereof. The above material for serving as the additive component all have a Curie temperature higher than 300° C. Therefore, after mixing the additive component with barium titanate ($BaTiO_3$) to form the composite phase, the whole dielectric ceramic material will have a Curie temperature higher than 130° C.

The dielectric ceramic material proposed in the present invention can be applied primarily in multilayer ceramic capacitors for having the dielectric temperature thereof more stable and satisfying the X8R or X9R characteristics regulated by EIA.

In one embodiment, the additive component is 1% to 50% molar percent of lithium tantalite (LiTaO3), barium cerate ($BaCeO_3$), sodium metaniobate ($NaNbO_3$).

The procedures of manufacturing the dielectric ceramic material and the electricity measurements thereof, in the case of barium titanate with the additive of lithium tantalite (LiTaO3) or in the case of barium titanate with the additive of Sodium metaniobate ($NaNbO_3$), are illustrated in detail as following.

First, in the case of adding the additive component of lithium tantalite (LiTaO3) within the barium titanate, 0.5% to 25% molar percent of lithium carbonate ($Li_2CO_3$) and tantalum oxide ($Ta_2O_5$) are added into the barium titanate for forming initial powder of (1-x)($BaTiO_3$)-x(LiTaO3), or the lithium carbonate ($Li_2CO_3$) and the tantalum oxide ($Ta_2O_5$) are reacted to form a lithium tantalite (LiTaO3) compound and then mixed with barium titanate. In another embodiment, barium carbonate ($BaCO_3$) and cerium oxide ($CeO_2$) with mole percentage of 1% to 50% are reacted to be a barium cerate (BaCeO3) compound, and then the barium titanate is reacted with 1% to 50% moler percent of the barium cerate to form the initial powder of (1-x)($BaTiO_3$)-x(BaCeO3). In further embodiment, the molar percent 1% to 50% of sodium metaniobate ($NaNbO_3$) is mixed with the barium titanate to form the initial powder of (1-x)($BaTiO_3$)-x($NaNbO_3$).

The table 1, as below, illustrates different embodiments for forming the powders of the dielectric ceramic material in the present invention.

TABLE 1 embodiments of different additive and mole percentage for adding within barium titanate ceramic material.

| (1 − x)($BaTiO_3$) − x(LiTaO_3) unit: mole | | | | |
|---|---|---|---|---|
| | | $BaTiO_3$ | $Li_2CO_3$ | $Ta_2O_5$ |
| embodiment 1 | x = 0.1 | 0.9 | 0.05 | 0.05 |
| embodiment 2 | x = 0.15 | 0.85 | 0.075 | 0.075 |
| embodiment 3 | x = 0.2 | 0.8 | 0.1 | 0.1 |
| embodiment 4 | x = 0.25 | 0.75 | 0.125 | 0.125 |
| embodiment 5 | x = 0.27 | 0.73 | 0.135 | 0.135 |
| embodiment 6 | x = 0.3 | 0.7 | 0.15 | 0.15 |
| embodiment 7 | x = 0.35 | 0.65 | 0.175 | 0.175 |

| (1 − x)($BaTiO_3$) − x($NaNbO_3$) unit: mole | | | |
|---|---|---|---|
| | | $BaTiO_3$ | $NaNbO_3$ |
| embodiment 8 | x = 0.1 | 0.9 | 0.1 |
| embodiment 9 | x = 0.2 | 0.8 | 0.2 |
| embodiment 10 | x = 0.3 | 0.7 | 0.3 |

Referring to FIG. 1, which illustrates the method of manufacturing the dielectric ceramic material in the present invention. It is noted that the method is not limited as illustrated, and all other process for manufacturing the ceramic material well-known by those persons with ordinary skill in the art can be applied to manufacture the dielectric ceramic material of the present invention. For example, in one embodiment of the present invention wherein the lithium tantalite is added within the barium titanate, a ball grinding procedure is performed to mix the barium titanate, the lithium carbonate ($LiCO_3$) and tantalum oxide ($Ta_2O_5$) with a specific molar ratio about 24 hours, as step S100.

A baking step is performed to dry the mixture powder, and the mixture powder is then calcined at 800° C. about 4 hours as step S105 to form the desired compound. A second time ball grinding procedure is performed as step S110. Because the particles are too large after the calcining procedure, the second time ball grinding procedure is applied to have the particles be more small, thereby the compound particles can easily be densified at low sintering temperature in the sintering procedure later. After sifting and granulating, the compound particles are briquetted to produce embryos as step S115.

The embryos are burned in a low temperature furnace at 550° C. about 4 hours to burn off the binder, as step S120. After, as step S125, a sintering procedure is performed in a reduction atmosphere. The gas of the reduction atmosphere includes nitrogen and hydrogen, and has a ratio of $N_2:H_2=97:3$. The flow rate of gas is about 0.3 liters/min and the dew point temperature is 45° C. In this embodiment, the sintering temperature is about 1150° C. to 1275° C., and the sintering time is 2 hours. After the sintering step, the dielectric ceramic material will have the desired compactness for application.

Finally, a heat treatment is performed to reoxidate the dielectric ceramic material, as step S130. The heat treatment is performed at 1000° C. several hours to decrease the much oxygen vacancies of the dielectric ceramic material formed in the sintering step at the reduction atmosphere. The time of heat treatment can be adjusted according to the mole percentage of the lithium tantalite mixed and the compactness of the dielectric ceramic material after the sintering step.

Figure 2:
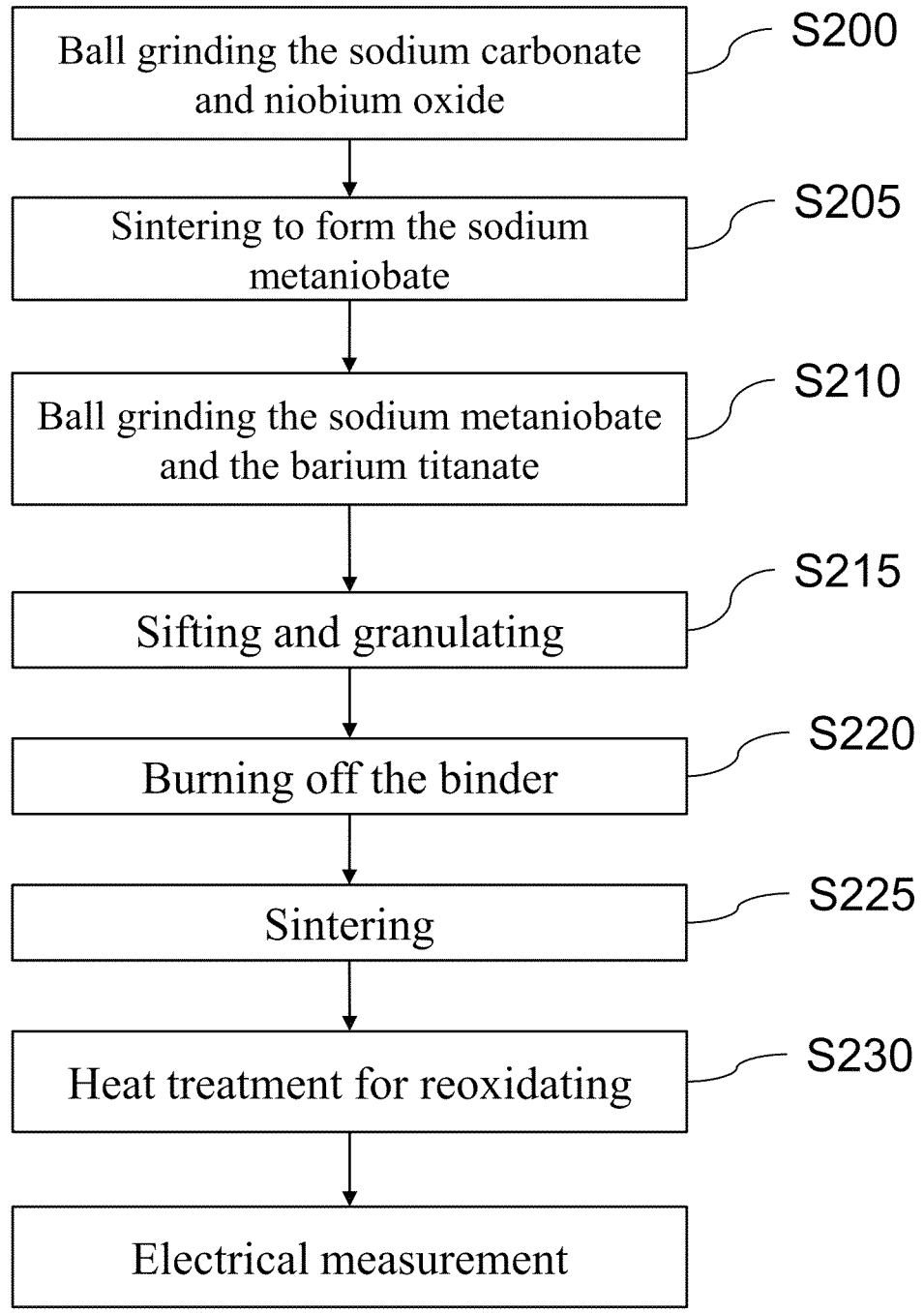
FIG. 2 is a flow chart showing another process for manufacturing the dielectric ceramic material according to the present invention.

Another embodiment for manufacturing the dielectric ceramic material of the present invention is adding the sodium metaniobate ($NaNbO_3$) within the barium titanate. Referring to FIG. 2, different to the aforementioned embodiments, the powder of sodium carbonate ($Na_2CO_3$) and niobium oxide ($Nb_2O_5$) are mixed by ball grinding at a specific component ratio for 12 hours, as step S200. Then, a calcining step is performed to form the additive compound of sodium metaniobate ($NaNbO_3$), as step S205. In the embodiment of the present invention, the calcining step is performed at 950° C. about 2 hours.

The sodium metaniobate ($NaNbO_3$) compound are then mixed and ball grinded with the barium titanate about 24 hours, as step S210. After sifting and granulating, the compound power is briquetted to produce embryos as step S215. Then, the embryos are burned in a low temperature furnace at 550° C. about 4 hours to burn off the binder, as step S220.

A sintering procedure is performed in a reduction atmosphere as step S225. The condition of the reduction atmosphere is basically same as that of aforementioned embodiment, but in this embodiment, the sintering temperature is about 1150° C. to 1300° C., and the sintering time is 2 hours. At last, a heat treatment of reoxidation is performed, as step S230. The heat treatment in this embodiment is performed at 900° C. about 2 to 10 hours.

Figure 3A:
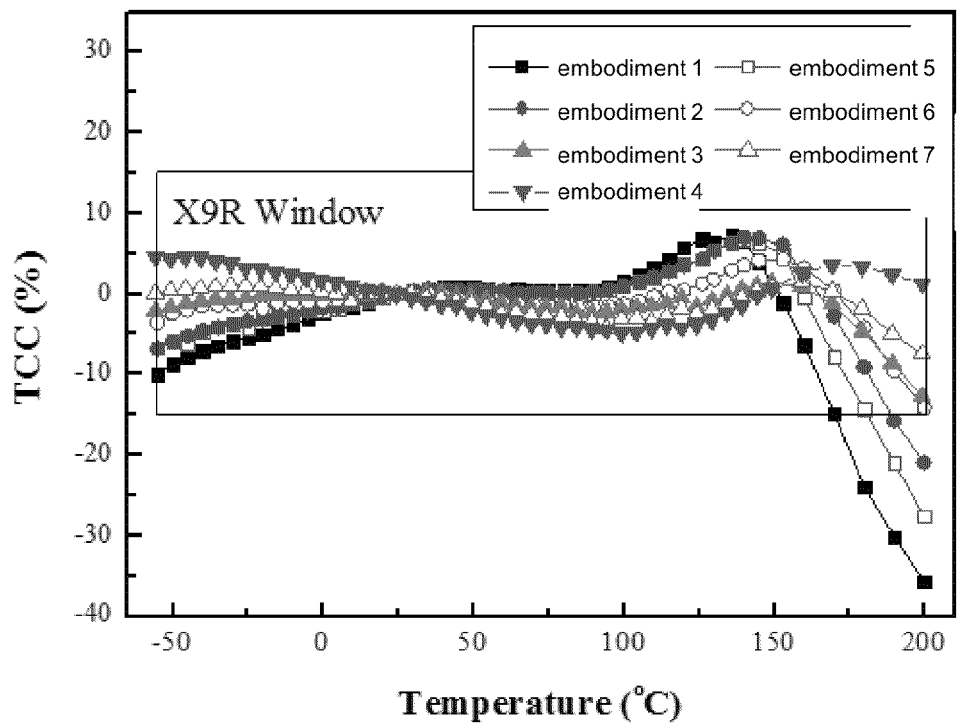
FIG. 3A to 3B are the measurements illustrating the dielectric temperature stability of the dielectric ceramic material in the embodiment 1 to 7 according to the present invention.
Figure 3B:
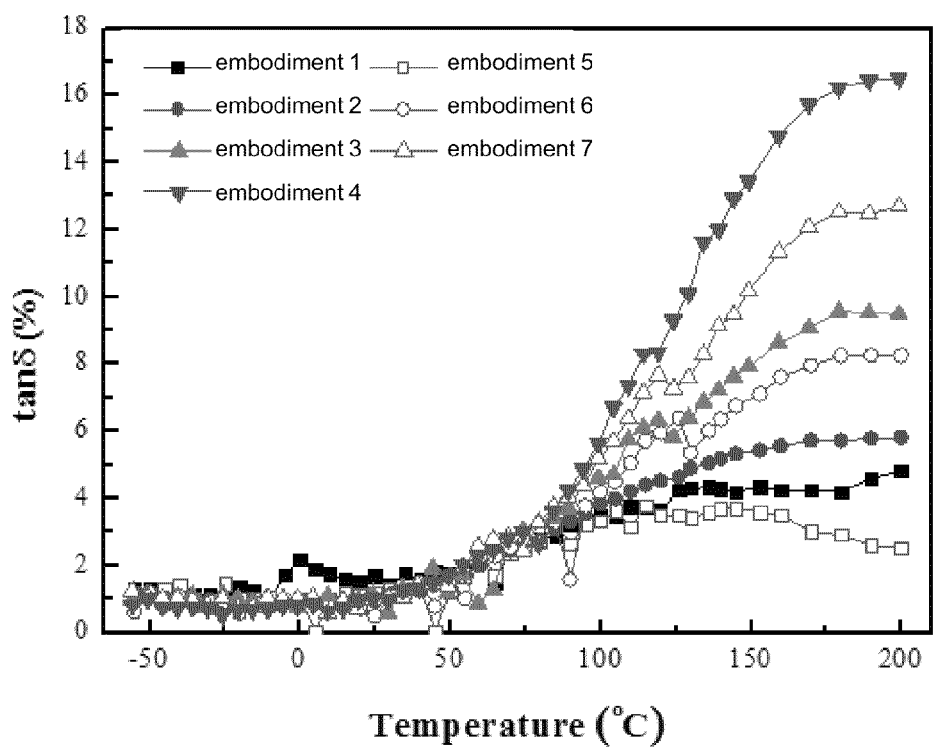

The electricity measurement of the produced material are shown in FIG. 3A and FIG. 3B, which illustrate that the capacitance temperature coefficient and the dielectric loss of the material which includes the barium titanate and the additive of lithium tantalite. As shown in FIG. 3B, the dielectric loss (tan δ) in embodiments 1 to 7 are all below 2% at room temperature.

As shown in FIG. 3A, the capacitance temperature coefficients in embodiments 1 to 3 all satisfy the X8R characteristic of the Electronics Industry Association (EIA) standard. Besides, the capacitor temperature coefficient can be promoted about 7% at the temperature 200° C. when the additive of lithium tantalite is increased 5 mol % each time. The capacitor temperature coefficients in embodiments 4 to 7 all satisfy the X9R characteristics (−55 to 200° C., $\Delta C/C \leq 15\%$) of the EIA standard. According to these embodiments, it is clear that the dielectric temperature is stable to meet the X9R characteristics and even can be stable in more large temperature range.

The dielectric constants (k) measured in the embodiments 1 to 4 are respectively 1865, 1669, 1325 and 1073. It is clear that the dielectric constants are decreased when the additive of lithium tantalite is increased. Therefore, the additive is better below 50 mol %.

Figure 4:
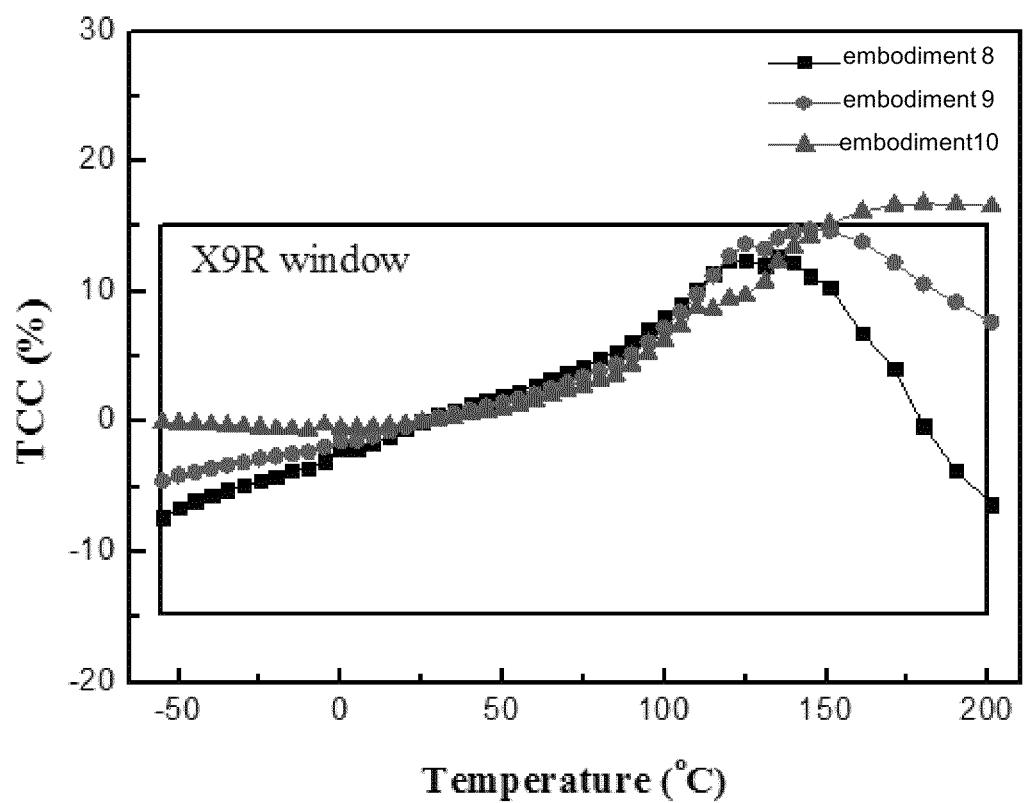
FIG. 4 is a measurement illustrating the dielectric temperature stability of the dielectric ceramic material in the embodiment 8 to 10 according to the present invention.

Please refer to FIG. 4, the property of dielectric temperature of barium titanate added with sodium metaniobate ($NaNbO_3$). It is clear that the stability of the dielectric temperature in the embodiments 8 to 9 satisfy the X9R characteristics of the EIA standard, and the capacitor temperature coefficient in the embodiment 10 is about 16.56% at the highest temperature 200° C. of the X9R characteristic, so that the material in the embodiment 10 can also be applied to manufacture the ceramic capacitor meeting the X9R characteristics after the process being improved.

The dielectric constants (k) measured in the embodiments 7 to 9 can reach about 30000, which is a good performance for electricity. Although the dielectric loss is about 2% at room temperature, it proves that the temperature of Curie peak will shift to the higher temperature and a good stability of the dielectric temperature can be obtained in the case of the barium titanate being added with the dielectric material of higher Curie temperature.

Figure 5:
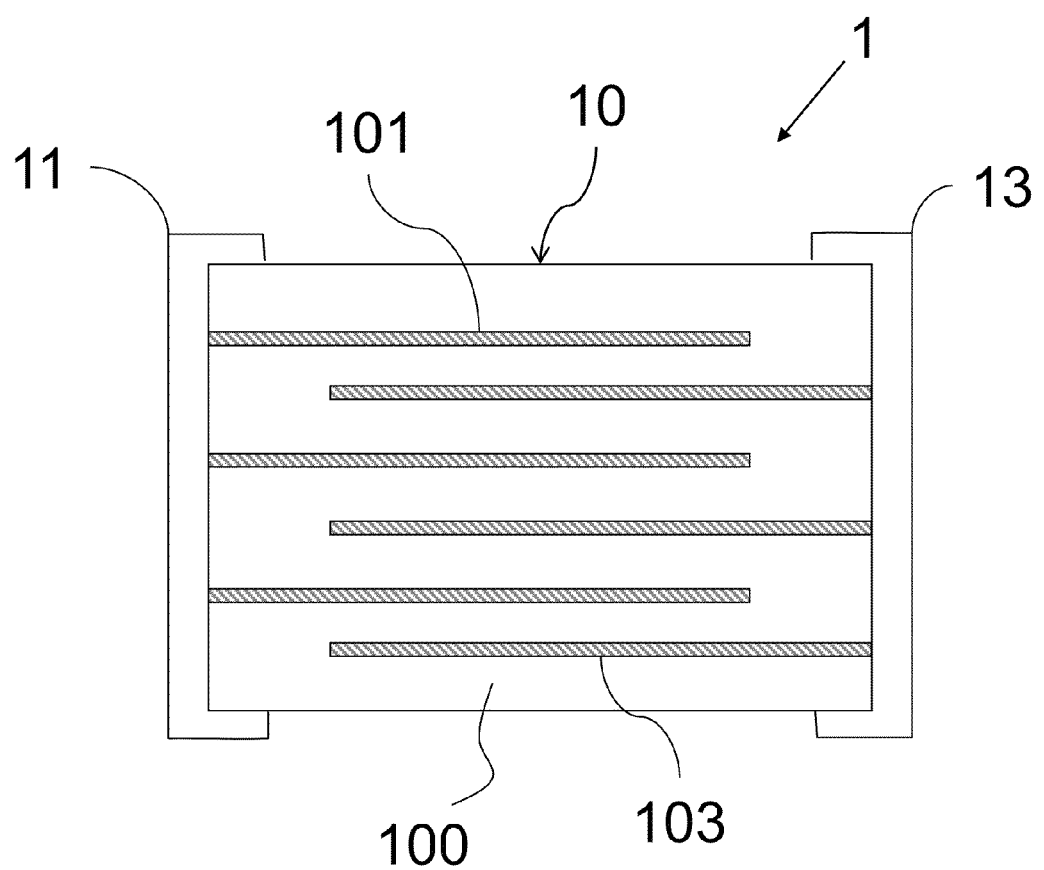
FIG. 5 is a cross sectional view of the structure of the multilayer ceramic capacitor manufactured according to the present invention.

The dielectric ceramic material of the present invention can be applied in a multilayer ceramic capacitor. Referring to FIG. 5, a cross sectional view of the structure of the multilayer ceramic capacitor is shown. The multilayer ceramic capacitor 1 includes a ceramic capacitor body 10, an outer cathode 11 and an outer anode 13.

The ceramic capacitor body 10 includes a plurality of dielectric ceramic layers 100 and a plurality of inner cathode layers 101 and inner anode layers 103 formed along surfaces of the dielectric ceramic layers 100. The inner cathode layers 101 and the inner anode layers 103 are staggered arranged, and are separated by the dielectric ceramic layers 100.

The outer cathode 11 and the outer anode 13 are formed on outside of the ceramic capacitor body 10 and respectively connected to the inner cathode layers 101 and the inner anode layers 103. In this application, the dielectric ceramic layers 100 are formed by sintering the dielectric ceramic material provided by the present invention.

In the case of forming the dielectric ceramic layers 100 by applying the dielectric ceramic material provided in the present invention, the capacitor temperature coefficient of the multilayer ceramic capacitor 1 satisfies the X8R and X9R characteristics of the Electronics Industry Association (EIA) standard, namely the operating temperature range of the multiplayer ceramic capacitor 1 is between −55 to 200° C., with zero bias capacitance shift limited to 15%.

The multiplayer ceramic capacitor and the dielectric ceramic material provided by the present invention have the following advantages:

(1) The Curie peak will shift to the higher temperature in the case that the barium titanate is added with the dielectric material of higher Curie temperature to form the dielectric ceramic material.

(2) The multiplayer ceramic capacitor formed of the dielectric ceramic material provided in the present invention can totally satisfy or even be better than the X8R and X9R characteristics, thereby to be adapted for the microelectronic devices operating in a large temperature range.

(3) The dielectric ceramic material proposed in the present invention all are sintered at a reduction atmosphere, thereby suitable for the Base-Metal-Electrode (BME) process and can be integrated with the process of manufacturing the multilayer ceramic capacitors, to facilitate the development and utilization on market.

The preferred embodiments of the invention have been set forth as above description, however the spirit and scope of the present invention are not limited to the aforementioned embodiments. It is easy for those who with ordinary skill in the art to understand and have modifications of the disclosed embodiments for the same purpose. Therefore, the appended claims are intended to cover all embodiments which do not depart from the spirit and scope of the invention.

What is claimed is:

1. A dielectric ceramic material comprising a primary component of barium titanate ($BaTiO_3$) and at least one additive component,
   wherein the additive component is 1% to 50% molar percent of lithium tantalite ($LiTaO_3$).

2. A dielectric ceramic material comprising a primary component of barium titanate ($BaTiO_3$) and at least one additive component,
   wherein the additive component is 1% to 50% molar percent of barium cerate ($BaCeO_3$).

* * * * *